United States Patent [19]
Heiermann

[11] Patent Number: 5,330,159
[45] Date of Patent: Jul. 19, 1994

[54] APPARATUS FOR AUTOMATICALLY INSERTING AND REMOVING SCREW-THREADED ELEMENTS INTO AND FROM TAPPED BORES

[75] Inventor: Siegfried Heiermann, Waltrop, Fed. Rep. of Germany

[73] Assignee: Westfalia Becorit Industrietechnik GmbH, Fed. Rep. of Germany

[21] Appl. No.: 5,560

[22] Filed: Jan. 19, 1993

[30] Foreign Application Priority Data

Jan. 20, 1992 [DE] Fed. Rep. of Germany ....... 4201324

[51] Int. Cl.$^5$ ............................................ B25B 29/00
[52] U.S. Cl. ............................................. 254/29 A
[58] Field of Search ............... 254/29 A; 29/452, 252, 29/723; 81/57, 38

[56] References Cited

U.S. PATENT DOCUMENTS 3,287,999 11/1966 Kreck et al. ...................... 254/29 A
4,216,876 8/1980 Warnke .
5,101,694 4/1992 Sevelinge et al. ................. 81/57.38

FOREIGN PATENT DOCUMENTS 2428847 1/1976 Fed. Rep. of Germany .

*Primary Examiner*—Robert C. Watson
*Attorney, Agent, or Firm*—Samuels, Gauthier & Stevens

[57] ABSTRACT

Apparatus for automatically inserting and removing screw-threaded elements into and from threaded bores of a pressure vessel to fit or detach a cover employs a screw-clamping device with a carrier ring supporting individual mechanisms for each screw-threaded element. Each mechanism employs a pair of parallel hydraulic piston and cylinder units with their cylinders supported for sliding on a flat surface of the carrier ring and their piston rods linked to a pressure bridge which brace on a shoulder of a screw-threaded sleeve fitted onto the associated screw-threaded element. The entire mechanisms is displaceably adjustable relative to the carrier ring predominantly in a radial direction relative to a common pitch circle for all the screw-threaded elements.

9 Claims, 4 Drawing Sheets

APPARATUS FOR AUTOMATICALLY INSERTING AND REMOVING SCREW-THREADED ELEMENTS INTO AND FROM TAPPED BORES

FIELD OF THE INVENTION

The present invention relates to apparatus for use in automatically setting screw-threaded elements, such as bolts or studs, into tapped bores and securing nuts onto the elements. The invention relates particularly to such apparatus usable to insert studs into tapped bores in a pressure vessel, to remove the studs from the bores and to screw and unscrew nuts on the studs to fit or detach a cover to or from the vessel. In the case of pressure vessels for nuclear fuel for instance, access for personnel is restricted and hence the apparatus needs to perform its function automatically remote from human operatives.

BACKGROUND OF THE INVENTION

Apparatus of the type with which the invention is concerned is described in U.S. Pat. application Ser. No. 07/991,106 filed Dec. 16, 1992, now U.S. Pat. No. 5,271,297 in the names Siegfried Heiermann and Horst Werner Oehler. As described in the aforementioned U.S. Patent application when the screw-threaded elements or studs are to be released or if nuts are to be screwed onto or from the elements it is necessary to tension or brace the elements. To achieve this a carrier ring is set onto the cover of the vessel and piston and cylinder units are extended to urge bridge members against shoulders on screw-threaded sleeves fitted onto the screw-threaded elements. With the elements braced in this fashion the nuts can be slackened or tightened to achieve as uniform as possible clamping pressure on the cover. When the gaps between the screw-threaded elements disposed on a common pitch circle are relatively small the piston and cylinder units are usually disposed in pairs in a parallel manner outside the pitch circle with the screw-threaded elements therebetween. (See also DE-2428247 and U.S. Pat. No. 4216876). One problem encountered with the known clamping devices is to achieve uniform forces from the two units straddling each screw-threaded element axially to the latter without imposing torque. In practice this is difficult because the screw-threaded elements are often distorted by the clamping forces on the cover and these elements tend mainly to flex towards the outside rim of the cover. Also the flange of the vessel in which the threaded bores are provided can become deformed. It is also the case that the threaded bores are not always exactly positioned on the same common pitch circle. As a result of these various factors the two units of one mechanism are often not at exactly the same radial spacing from the screw-threaded element relative to the pitch circle and there is imbalance which gives rise to an undesired torque on the screw-threaded element.

An object of the present invention is to provide an improved form of clamping device or set of mechanisms.

SUMMARY OF THE INVENTION

According to the invention a device for subjecting screw-threaded elements to tension comprises a carrier for engaging on a cover of a pressure vessel and having apertures for receiving screw-threaded elements set on a common pitch circle, clamping mechanisms each with a pair of hydraulic piston and cylinder units connected to a pressure bridge which is engageable with abutment means on one of the associated screw-threaded elements and means mounting the mechanisms on the carrier for adjustment radially of the pitch circle.

Preferably the mounting means includes guides for guiding each mechanism. By these measures the clamping forces exerted by the units of the mechanisms can be balanced to provide uniform axial tensioning of the screw-threaded elements even if the elements are distorted and even if there are deviations from the common pitch circle setting.

As is known, the piston and cylinder units used for tensioning the screw-threaded elements are combined with the associated pressure bridge to form a mechanism as one structural assembly and the mechanisms are individually adjustable relative to the screw-threaded element assigned thereto. Even if there is some deviation in the positioning of the screw-threaded elements caused for example, lateral bending or inaccuracy in production the mechanisms can be adjusted so that the units thereof apply axial force to the screw-threaded elements without appreciable torque. Preferably the mechanisms as a whole float to a certain extent so as to move both radially of the pitch circle and around the pitch circle. This freedom of movement permits the mechanisms to align themselves automatically to some extent relative to the screw-threaded elements. It is however desirable to provide adjustment devices to displace the mechanisms in the radial sense. The adjustment devices can take the form of hydraulic piston and cylinder units with the cylinders mounted on brackets fixed to the carrier. The use of adjustment devices is particularly advantageous when the positioning of the mechanisms requires a substantial amount of displacement and the devices can then provide a rough setting of the mechanisms. Then when the clamping device as a whole is fitted on the cover of the vessel to locate the screw-threaded elements in the bores in the carrier the mechanisms can adjust themselves relative to the screw-threaded elements as a final positioning step. To achieve the necessary freedom or play the guides may engage with clearance in a pair of grooves in diametrically opposed locations on the cylinder of each mechanism. The adjusting device can also be connected to one of the cylinders with a coupling which also has a certain clearance or play. The guides then hold the cylinders reliably in face-to-face sliding contact with a support surface of the carrier while guiding the cylinders along their radial path of adjustment displacement.

The pistons or piston rods of the units making up each adjustable mechanism may be linked to the associated pressure bridge with the aid of flexible screws which pass through bores in the pressure bridge and engage in axial screw-threaded bores in the pistons or piston rods. At the transition zone between the pressure bridge and the pistons or piston rods centring sleeves which guide the flexible screws may be provided in recesses. The flexible screws allow some deformation of the pressure bridge without fracture.

The cylinders of the units of each mechanism may have a crowned end which slides on the carrier. A bore then extends through the base wall of the cylinder to permit the passage of hydraulic pressure fluid to and from a working chamber in the cylinder. This bore preferably connects with a connector set into a recess in the support surface of the carrier. These connectors communicate with further bores which connect to a hydraulic fluid supply or return line. To cope with the adjustment each connection has a large area mouth which communicates with the bore in the associated cylinder end wall so that hydraulic connection is established despite the displacement of the cylinder.

As is known, the clamping or tensioning forces produced by charging the working chambers of the cylinders of the mechanisms with pressure fluid can be transferred to the screw-threaded elements with the aid of threaded sleeves fitted onto the elements. These sleeves then have shoulders forming the abutment means for the pressure bridges. It is however possible to transfer the tensioning forces in other ways.

BRIEF DESCRIPTION OF DRAWINGS

An embodiment of the invention will now be described, by way of example only, with reference to the accompanying drawings; wherein.

To assist understanding of the invention reference may also be made to the prior art documents and U.S. Patent application mentioned hereinbefore which are herein incorporated by reference.

DESCRIPTION OF PREFERRED EMBODIMENT

Figure 1:
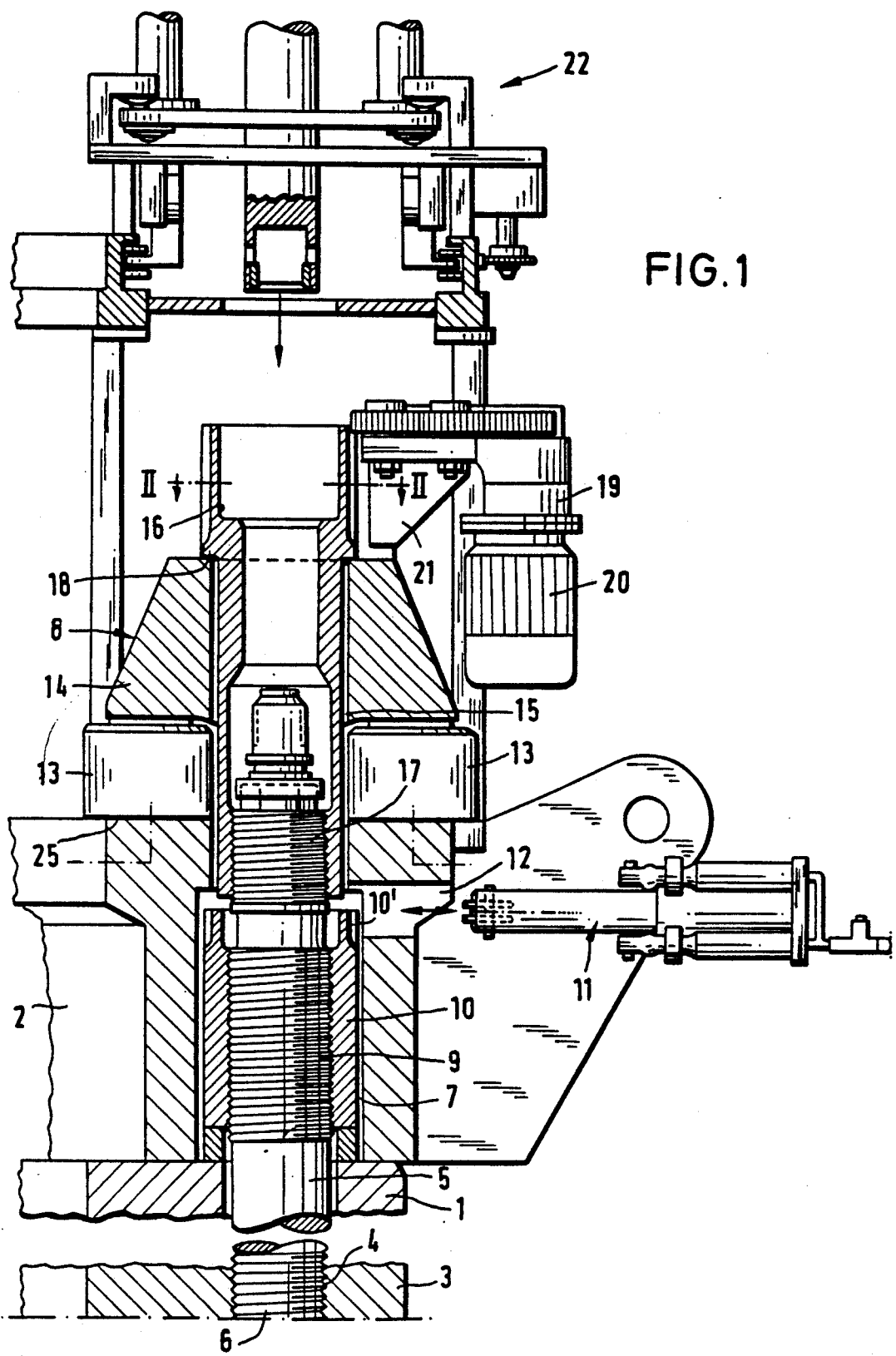
FIG. 1 is a partial vertical section through part of an apparatus constructed in accordance with the invention.

Apparatus in accordance with the invention includes a screw-turning device 22 at an upper region and a screw-clamping or tensioning device at a lower region. The apparatus is used for opening and closing the cover or lid 1 of a pressure vessel, such as reactor pressure vessel for nuclear fuels. The cover 1 is attached and clamped onto the vessel with cover flange which fits onto a flange 4 of the vessel. The flange 4 has a plurality of blind bores 4 distributed over a common pitch circle. Each blind bore 4 is provided with an internal screw-thread into which screw-threaded studs 5 are screwed with their lower threaded regions 6. Only one such stud 5 is shown in FIG. 1.

The clamping device comprises a carrier ring 2 with stepped bores 7 through which the studs 5 pass. The carrier ring 2 can engage on the cover 1 or its flange. For each stud 5 the carrier ring 2 supports a clamping mechanism 8 in the form of two hydraulic piston and cylinder units 13 and a pressure bridge 14 which connects these units 13. By means of the mechanisms 8 the individual studs 5 can be subjected to tension and held after being screwed into the associated bores 4 to permit a nut 10 engaged onto a screw-threaded region 9 of the stud 5 to be tightened up onto the cover or loosened. The nuts 10 are loosened or tightened with the aid of a nut setting device 11 which may include a motor. Lateral openings 12 in the ring 2 permit the device 11 to be introduced into one of the stepped bores 7 to engage with teeth 10 at the upper end of the associated nut 10 as indicated by the arrows in FIG. 1. The units 13 making up each mechanism 8 have their cylinders fitted to the carrier ring 2 and disposed mutually parallel to one another while the piston rods of the units 13 are connected together with the associated bridge 14. This bridge 14 has an aperture 15 aligned with one of the stepped bores 7 through which a threaded sleeve 16 is passed to engage with an upper screw-threaded region 17 of the associated stud 5. The sleeve 16 has a shoulder 18 which engages against the upper side of the bridge 14. When the units 13 are charged with pressure fluid the stud 5 is braced axially by means of the bridge 14 which exerts force on the shoulder 18. The sleeve 16 can be screwed onto the stud 5 or unscrewed therefrom by means of a rotary drive 19 with an electric motor 20 and gearing. The drive 19 is mounted on a bracket 21 fixed with screws or bolts onto the pressure bridge 14. The clamping device as illustrated with the carrier ring 2 and the mechanisms 8 and the nut setting device 11 mounted thereon is also operably associated with a screw-rotating device 22 for rotating the studs 5 to screw these into or out from the threaded bores 4. The device 22 may be constructed as described in the aforementioned U.S. patent application Ser. No. 07/991,106 filed Dec. 16, 1992 now U.S. Pat. No. 5,271,297 in the names of Siegfried Heiermann and Horst Werner Oehler.

The mechanisms 8 are displaceably mounted for adjustment on the carrier ring 2 and more particularly for movement radially of the ring 2 and radially of the pitch circle 23 of the studs 5. This adjustment is indicated by the arrow 24 in FIG. 3. The mechanisms 8 can also be displaceable to a limited extent in a direction around the periphery of the pitch circle 23 of the ring 2. The two units 13 of each mechanism 8 have the crowned end or bottom walls 44 of their cylinders slidably resting on a flat support surface 25 of the ring 2. The pistons 26 of the units 13 each have a stepped diameter with a central axially extending screw-threaded bore 27 into which a threaded shank of a resilient slender clamping screws 28 is screwed.

Figure 2:
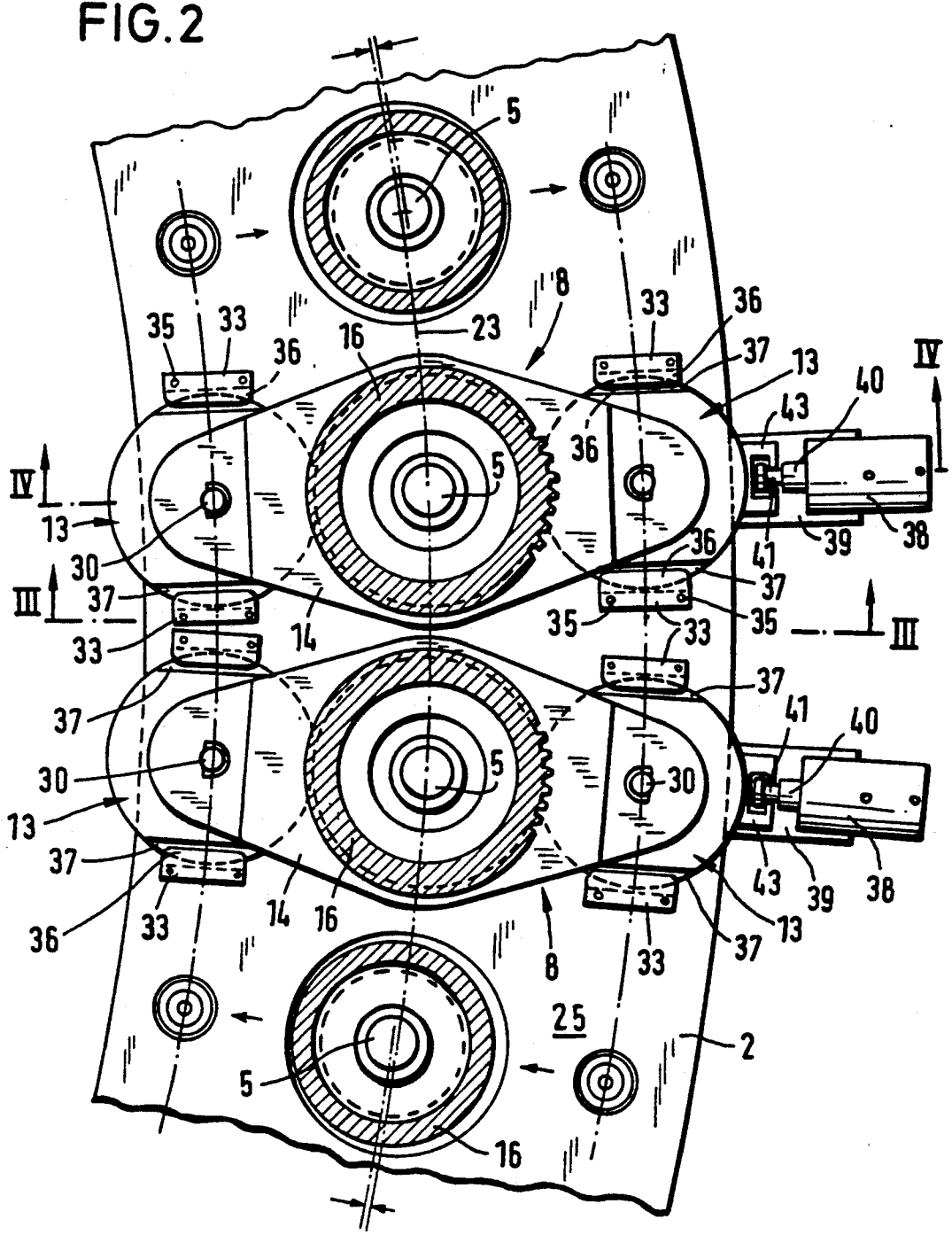
FIG. 2 is a plan view of the apparatus partly in section taken along the line II—II of FIG. 1 showing a clamping device thereof.
Figure 3:
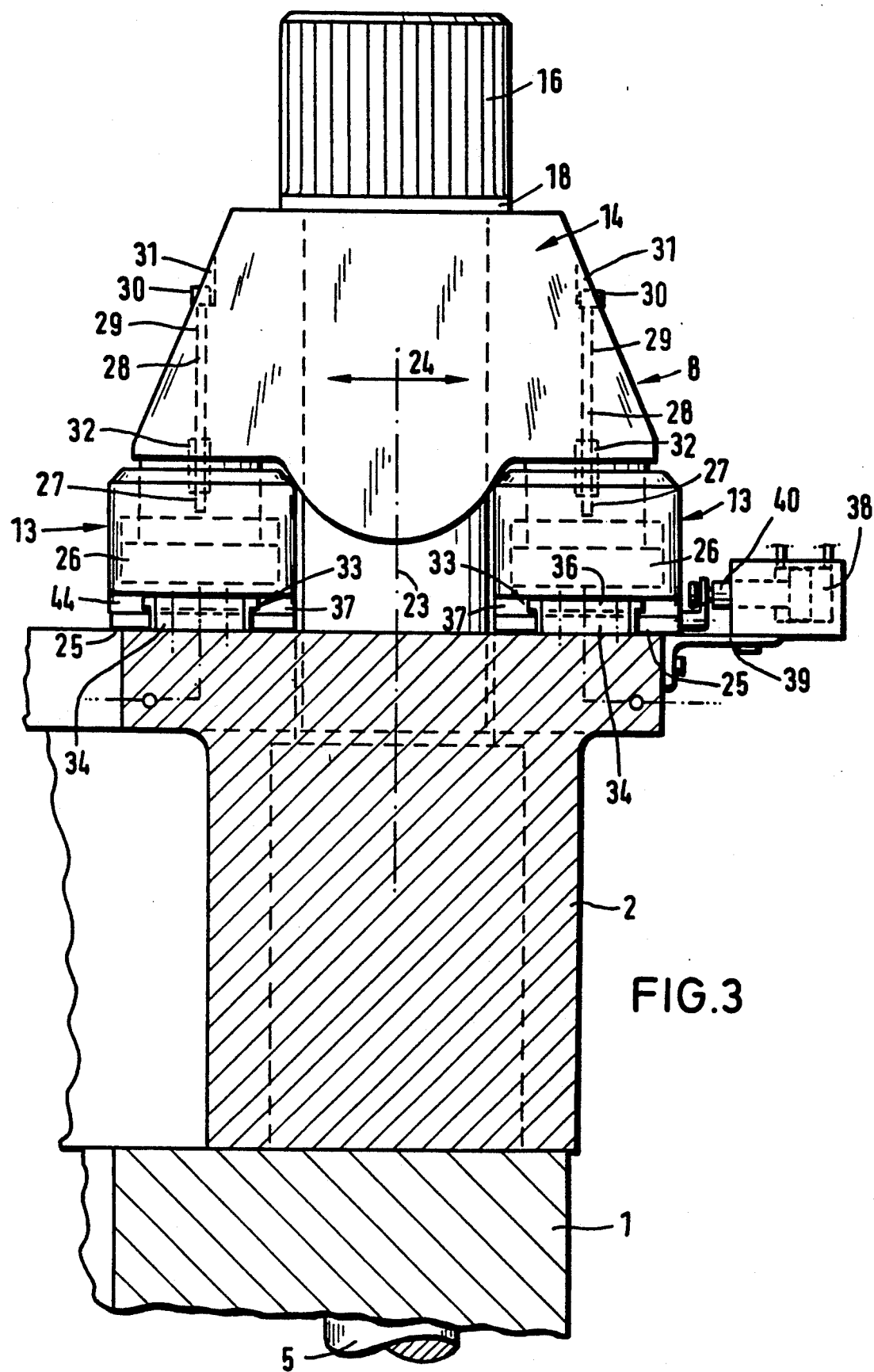
FIG. 3 is a cross-section taken along the line III—III of FIG. 2.

The screws 28 are guided by bores 29 in the bridge 14. The heads 30 of the screws 28 are set in recesses 31 in the pressure bridge 14. The bores 27, 29 have widened regions in which sleeves 32 are located to centre and align the bores 27, 29. The displaceability of the mechanisms 8 is achieved with aid of guide blocks 33. As shown in FIGS. 2 and 3 the guide blocks 33 each comprise a L-shaped component with a vertical arm 34 fixed, for example, with screws 35, to the carrier ring 2 and a horizontal arm 36 which engages in a groove 37 in the wall of the cylinder of the associated unit 13.

There are two such secant-shaped grooves 37 in diametrically opposed positions in each unit 13 as shown in FIG. 2. The guide blocks 33 thus reliably hold the units 13 on the ring 2 while permitting adjustment in the directions of the arrows 24. By providing a certain degree of clearance between the guide blocks 33 and the grooves 37 the units 13 and the mechanisms 8 can also move in the direction of the periphery of the ring 2.

Each mechanism 8 is also associated with an adjustment device which has a piston-and-cylinder unit 38 fixed to a bracket 39 screwed onto the periphery of the ring 2. The piston rod 40 of the unit 38 is coupled to the outermost unit 13 of the mechanism 8. The piston rod 40 has an annular groove 41 which receives a bi-furcated portion 42 of a coupling member 43 fitted to the cylinder of the outermost unit 13.

A certain clearance prevails between the coupling member 43 and the rod 40 in the radial direction (arrows 24). By charging the unit 38 with pressure fluid to cause the unit 38 to extend or retract the mechanism 8 can be displaced as desired in the appropriate direction of the arrows 24 whilst the guide blocks 33 perform their guidance function to ensure the mechanism 8 becomes correctly positioned in relation to the associated stud 5.

Figure 4:
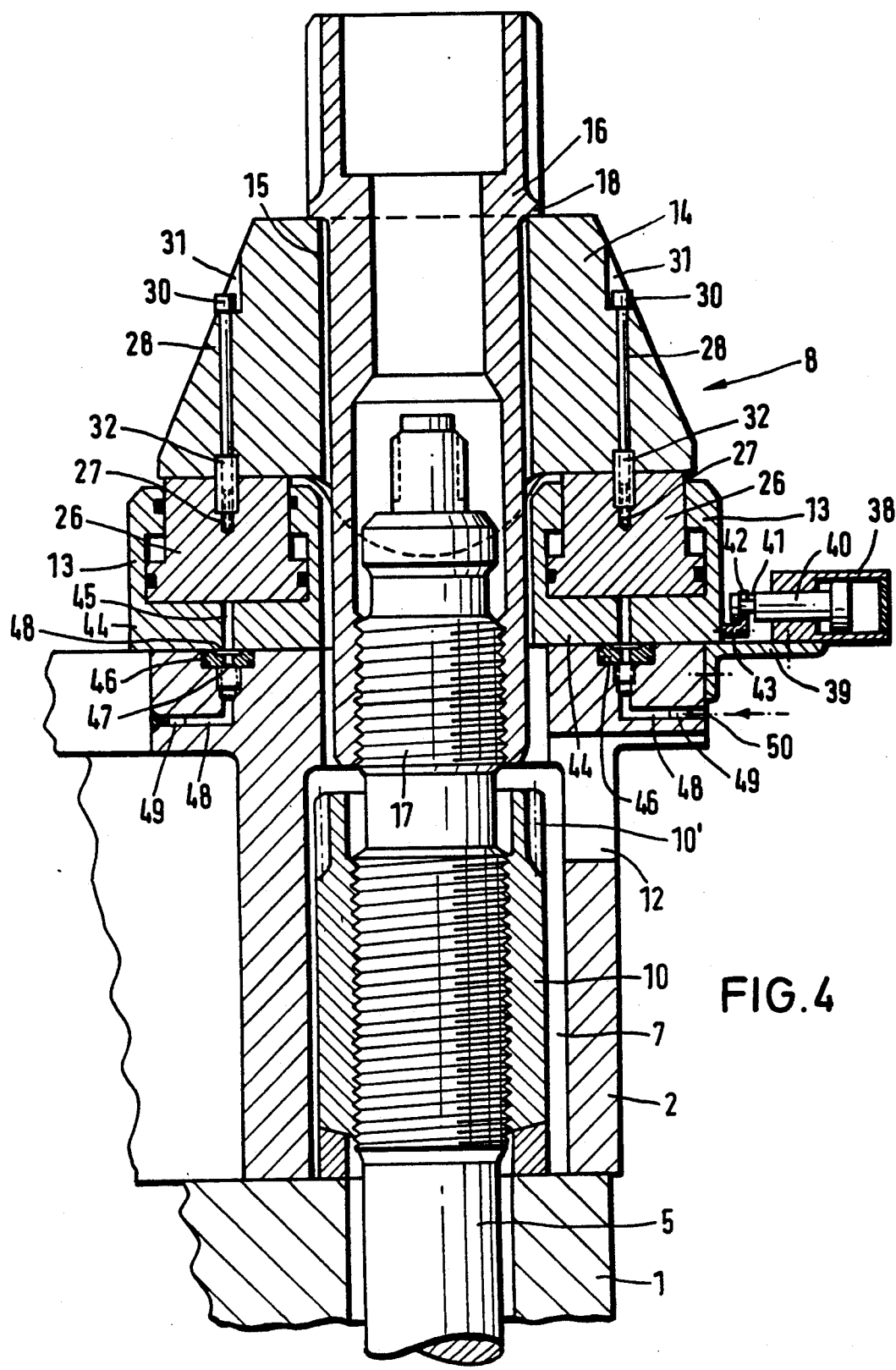
FIG. 4 is a cross-section taken along the line IV—IV of FIG. 2.

As shown in FIG. 4 the units 13 each have at the crowned lower end 44 a central bore 45 which communicates with a working chamber in the cylinder of the unit 13. The ring 2 has a set of screw-threaded recesses which receive connectors 46. Each connector 46 has an axial passage 47 alignable with the bore 45 of the associated unit 13. Each passage 47 also leads via an angled-off bore 48 to a connector 49 at the periphery of the ring 2. Each connector 46 also has a recessed portion 48 adjoining the passage 47 which establishes sealed hydraulic connection between the passage 47, the bore 48 and the bore 45 over the whole range of adjustment positions of the unit 13. As indicated by arrow 50 each connector 49 can be supplied with hydraulic pressure fluid and this flows to the working chamber to operate the unit 13 as described. The connectors 46 are thus designed to maintain the hydraulic connection despite adjustment of the mechanisms 8.

When the cover 1 is fitted to the vessel the clamping device with the ring 2 and the mechanisms 8 adjustably mounted thereon as described can be engaged onto the cover 1 when the sleeves 16 are removed. When the clamping device is fitted the upper ends 17 of the studs 5 engage in the apertures 7 in the ring 2. The sleeves 16 can be set and screwed onto the studs 5 with the aid of the drive 19 as shown in FIGS. 1, 3 and 4. The individual mechanisms 8 are aligned with their adjustment devices 38 in the directions of arrows 24 in relation to the studs 5 so that the units 13 of each mechanisms 8 are equi-distant from the axis of the associated stud 5. This individual adjustment of each mechanism 8 can be effected even if the studs 5 are not all precisely positioned relative to the common pitch circle 23. With different pressure vessels the studs 5 of one may not be on the same pitch circle as another so the adjustment can also overcome these deviations. It is also feasible for the studs 5 to be deformed and for the adjustment of the mechanisms 8 to compensate for such deformation.

Once the mechanisms 8 have been adjusted the simultaneous or successive charging of the units 13 of the mechanisms 8 with hydraulic pressure fluid will tension the studs 5 to permit release of the nuts 10.

Since the mechanisms 8 are adjustable relative to the carrier ring 2 within the guide blocks 33 as the screw tensioning device is being fitted to the cover 1 then as the sleeves 16 are screwed onto the studs 5 an automatic re-alignment of the mechanisms 8 in relation to the studs 5 can occur.

The adjustment devices 38 can thus provide a crude or rough adjustment of the mechanisms 8 while a more exact alignment takes place as the device is fitted or as the sleeves 16 are set. The coupling (41, 43) between the units 38 and the mechanisms 8 should be designed to allow positioning of the mechanisms 8. It is however possible to dispense with the units 38 and to rely on an automatic adjustment of the mechanisms 8. It is also possible to provide a more accurate positioning appliance for displacing the mechanisms 8.

The operation of the apparatus as regards the fitting or releasing of the cover 1 may be as described in the aforementioned U.S. patent application No. 07/991,106 filed Dec. 16, 1992 now U.S. Pat. No. 5,271,297 in the names of Siegfried Heiermann and Horst Werner Oehler.

What is claimed is:

1. An apparatus for use in automatically inserting and removing screw-threaded elements into tapped bores on a common pitch circle, particularly for attaching and detaching a cover of a reactor pressure vessel; a screw-clamping device for subjecting the screw-threaded elements to tension, said device comprising a carrier for engaging on the cover and having apertures for receiving the screw-threaded elements, clamping mechanisms each with a pair of hydraulic piston and cylinder units connected to a pressure bridge which is engageable with abutment means on one of the associated screw-threaded elements and mounting means for mounting the mechanisms on the carrier wherein the mounting means includes guides for guiding each mechanism relative to the carrier to permit adjustment of each mechanism radially and around the pitch circle.

2. Apparatus according to claim 1 wherein there are provided adjustment devices for effecting displacement of the mechanisms at least radially of the pitch circle.

3. Apparatus according to claim 2 wherein each adjustment device is fixed to a bracket secured to the carrier.

4. Apparatus according to claim 1, wherein at least one of the cylinders of the mechanisms has diametrically opposed grooves and the guides engage in these grooves.

5. Apparatus according to claim 1, wherein the units of each mechanism are connected to the associated pressure bridge with the aid of flexible screws which pass through bores in the pressure bridge and fit in screw-threaded bores in pistons rods of the units.

6. Apparatus according to claim 1, wherein the screws pass through sleeves set in recessed portions of the bores in the piston rods and the pressure bridge.

7. Apparatus according to claim 1, wherein the cylinders of the units of each mechanism slidably engage on a flat surface of the carrier, the cylinders have bores which communicates with connectors mounted in the flat surface and which connect with further bores for allowing the passage of pressure fluid through the connectors and the cylinder bores and each connector has a recess which adjoins the associated cylinder bore and maintains hydraulic connection with the bore throughout the adjustment of the mechanism.

8. Apparatus according to claim 1 wherein the abutment means is provided by shoulders of screw-threaded sleeves engaged on the screw-threaded elements.

9. Apparatus according to claim 2 wherein the adjustment devices are in the form of hydraulic piston and cylinder units and each unit is joined to one of the units of an associated mechanism with the aid of a coupling member permitting some freedom of movement between the respective units radially of the pitch circle.

* * * * *